United States Patent [19]

Appleby et al.

[11] 4,187,165

[45] Feb. 5, 1980

[54] BIPOLAR ELECTRODE FOR AN ELECTROLYSER

[75] Inventors: Anthony J. Appleby, Boulogne; Gilles Crépy, Evry, both of France

[73] Assignee: Compagnie Generale d'Electricite, Paris, France

[21] Appl. No.: 8,444

[22] Filed: Feb. 1, 1979

[30] Foreign Application Priority Data

Feb. 28, 1978 [FR] France ................................ 78 05661

[51] Int. Cl.² ...................... C25B 11/03; C25B 11/06; C25B 13/04
[52] U.S. Cl. .................................... 204/254; 204/268; 204/283; 204/284; 204/292; 204/295
[58] Field of Search ........ 204/290 R, 290 F, 254–256, 204/283, 284, 292, 295, 268

[56] References Cited

U.S. PATENT DOCUMENTS

| | | | |
|---|---|---|---|
| 3,291,714 | 12/1966 | Hall et al. | 204/290 F X |
| 4,007,107 | 2/1977 | Johnson | 204/292 X |
| 4,080,278 | 3/1978 | Ravier et al. | 204/292 X |
| 4,098,669 | 7/1978 | De Nora et al. | 204/254 X |
| 4,098,671 | 7/1978 | Westerlund | 204/284 |

Primary Examiner—John H. Mack
Assistant Examiner—D. R. Valentine
Attorney, Agent, or Firm—Sughrue, Rothwell, Mion, Zinn and Macpeak

[57] ABSTRACT

A bipolar electrode for an electolyser. It is characterized in that the anode surface and the cathode surface of said electrode both comprise a porous conductive material which includes sintered nickel previously impregnated with nickel molybdate. The invention is used for manufacturing hydrogen by electrolysing an aqueous alkaline solution.

11 Claims, 4 Drawing Figures

BIPOLAR ELECTRODE FOR AN ELECTROLYSER

FIELD OF THE INVENTION

The present invention relates to a bipolar electrode for an electrolyser having a basic solution, in particular an aqueous solution of the type in which oxygen is evolved at the anode and hydrogen is evolved at the cathode.

It also relates to a method which is suitable for producing such an electrode.

BACKGROUND OF THE INVENTION

Known bipolar electrodes include, for example, a sintered conductive support impregnated with two catalysers of different types, one intended to operate on the anode part and the other on the cathode part.

It is difficult to impregnate the two parts of the cathode differently and the methods of doing so are complicated and not very satisfactory.

The present invention aims to mitigate these drawbacks and thereby provide a bipolar electrode.

SUMMARY OF THE INVENTION

The present invention provides a bipolar electrode for an electrolyser having a basic electrolyte, wherein the anode surface and the cathode surface of said electrode both comprise a porous conductive material which includes sintered nickel previously impregnated with nickel molybdate.

Advantageously, the ratio by weight between nickel molybdate and nickel lies substantially between 20 and 40%.

The invention also provides a method of preparing a bipolar electrode, wherein said porous conductive material is impregnated by at least a first immersion of the electrode in an aqueous solution of a soluble derivative of molybdenum capable subsequently of being thermally decomposed into molybdenum oxide, and a second immersion of the electrode in a nickel salt solution, said second immersion being followed by heating in a hydrogen atmosphere and at a temperature of about 450° C.

Embodiments of the invention are described, by way of example, with reference to the accompanying drawings.

DESCRIPTION OF PREFERRED EMBODIMENTS

One embodiment of a bipolar electrode in accordance with the present invention is produced as described hereinbelow.

Firstly, the following mixture is formed:
Nickel powder: 1000 g
Carboxymethylcellulose: 14.5 g
Water: 1 liter The particle size of the nickel powder used is in the order of 5 microns and is obtained by thermal cracking of nickel tetracarbonyl, $Ni(CO)_4$.

A thick paste is thus obtained and is coated on a conductive plate made of nickel-plated metal.

After drying, sintering is effected in a hydrogen atmosphere at a temperature lying between 900° and 1000° C. and maintained for 10 minutes to 1 hour, not including the rise and fall of the temperature. The sintering temperature is preferably maintained at 950° C. for 30 minutes.

Then, the material obtained by the above method is sparingly impregnated. For this purpose, said material is immersed in an aqueous ammonium molybdate solution at a concentration equivalent to 2 moles per liter of molybdenum trioxide suitable for decomposing into molybdenum dioxide or trioxide on subsequent heating. After immersion, the material is heated for 1 to 2 hours in air at a temperature which lies between 200° and 900° C., and which is preferably 450° C.

The texture is then impregnated a second time, this time in a nickel nitrate solution and is then heated in a hydrogen atmosphere and at a temperature close to 450° C. One variant consists in performing the two immersions simultaneously in an aqueous solution of ammonium molybdate and nickel nitrate.

Advantageously, the material is lyophilized (freeze dried) at low temperature in a vacuum before being heated in a hydrogen atmosphere.

A bipolar electrode is thus obtained which is suitable for producing hydrogen and oxygen in an electrolyser having an aqueous basic solution.

The anode surface as well as the cathode surface of such an electrode is made of sintered nickel whose porosity lies between about 30 to 50%; the nickel is therefore impregnated with nickel molybdate in a quantity such that the ratio by weight between nickel molybdate and nickel lies substantially between 20 and 40%.

An electrolyser which uses bipolar electrodes in accordance with the invention will now be described with reference to FIG. 1.

Figure 1:
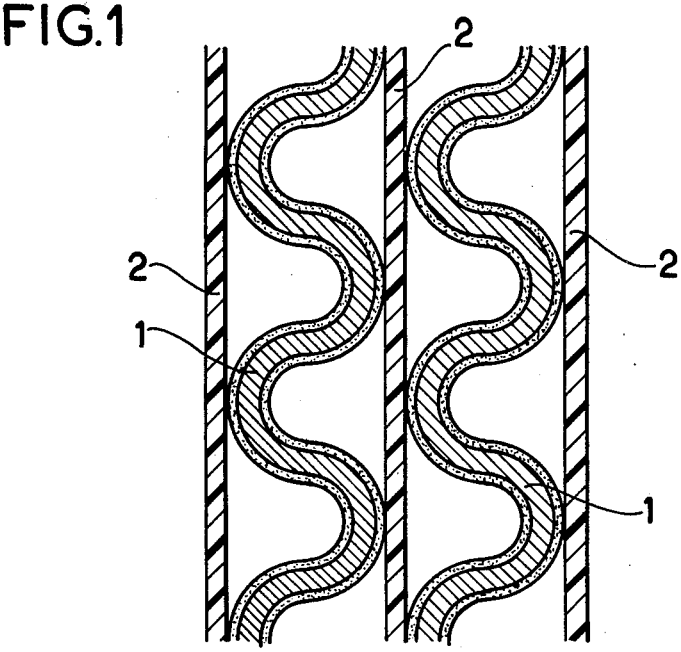
FIG. 1 is a sectional view which illustrates very schematically an electrolyser which uses a bipolar electrode in accordance with the invention.

FIG. 1 illustrates by way of a non-limiting example two bipolar electrodes 1 produced as described hereinbelow. These electrodes are corrugated as shown and are separated from each other by plane felt separators 2 of potassium titanate and a binding agent, said felt having a fibrous texture, and said binding agent being preferably polytetrafluoroethylene. The electrolyte, namely an aqueous potassium anhydride solution in a concentration lying between N and 14N immerses the assembly or circulates between the electrodes. Operation temperature lies between ambient temperature and 180° C. at a pressure of about 50 bars.

Oxygen is evolved at the anode surface of each electrode where the nickel molybdate is transformed spontaneously into a nickel oxide catalyser of the type described by the Applicants in U.S. patent application Ser. No. 825,508 filed on Aug. 17, 1977 entitled "Electrolyser for a Basic Solution" while hydrogen is evolved at the cathode surface.

Figure 2:
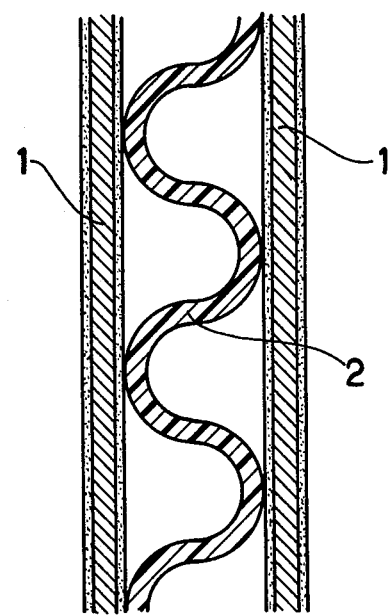
FIG. 2 is a sectional view which illustrates a variant of said electrolyser.

FIG. 2 illustrates a variant of an electrolyser which uses bipolar electrodes in accordance with the invention.

In this variant, the electrodes 1 are plane, while the separators such as 2 are corrugated as shown, all other characteristics being otherwise the same as those of the preceding embodiment.

In all cases, it will be observed that the composition of the anode surface is identical to that of the cathode surface.

Such an electrode provides stable operation of the electrolyser, in particular at temperatures in the order of 140° C., without danger of corrosion by the basic electrolyte.

The electrodes in accordance with the invention can advantageously be applied to manufacturing hydrogen by electrolysis of aqueous alkaline solutions.

Figure 3:
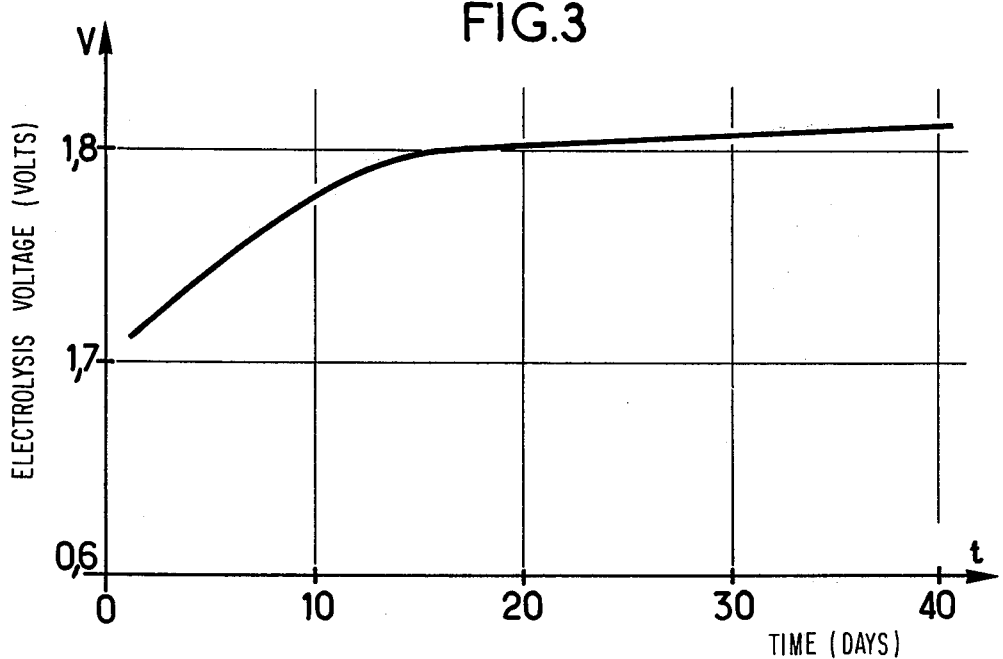
FIGS. 3 and 4 are electrolysis voltage plots against time, which illustrate the performance of a bipolar electrode in accordance with the invention.
Figure 4:
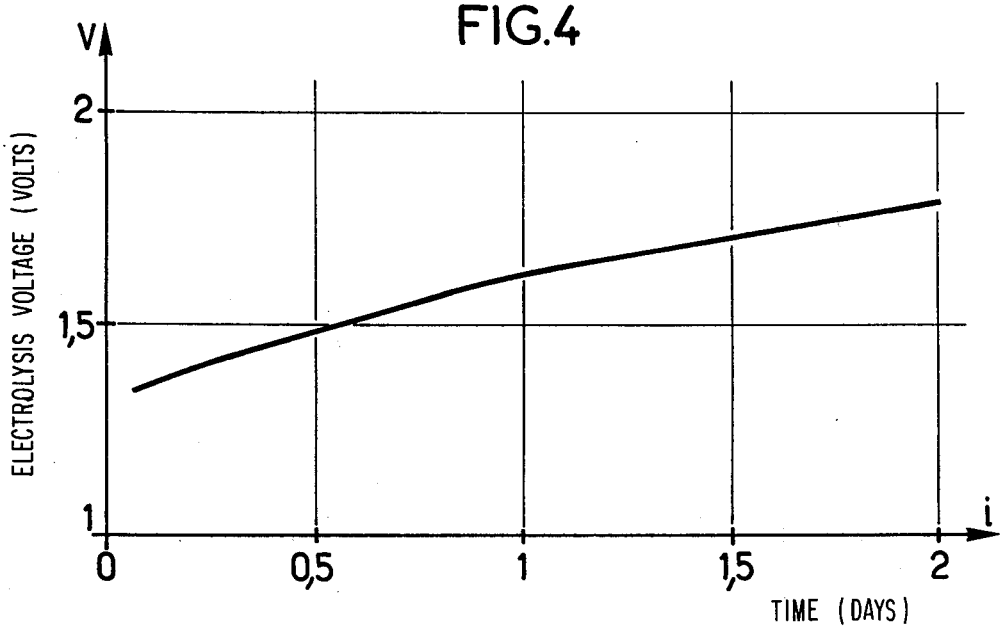

FIG. 3 and FIG. 4 illustrate the performance of a bipolar electrode in accordance with the invention.

Thus, FIG. 3, in which the electrolysis voltage V in volts is plotted as a function of time in days, shows the stability of the operation of such an electrode at 80° C. with a current density of 0.4 A/cm$^2$, the electrolyte being an 8N potassium hydroxide solution. In FIG. 4 the electrolysis voltage V is plotted as a function of the density of the current i in A/cm$^2$, for a cell at a temperature of 115° C. and in which the electrolyte circulates at a speed of 10 cm/second.

We claim:

1. A bipolar electrode for an electrolyser having a basic electrolyte, said bipolar electrode including anode and cathode surfaces, the improvement wherein the anode surface and the cathode surface of said electrode both comprise a porous conductive material which includes sintered nickel previously impregnated with nickel molybdate.

2. An electrode according to claim 1, wherein the ratio by weight between nickel molybdate and nickel lies substantially between 20 and 40%.

3. An electrode according to claim 1, wherein the porosity of said porous conductive material impregnated with nickel molybdate lies substantially between 30 and 50%.

4. An electrolyser comprising a basic electrolyte and a bipolar electrode including anode and cathode surfaces, said bipolar electrode anode surface and cathode surface both comprising a porous conductive material which includes sintered nickel previously impregnated with nickel molybdate.

5. An electrolyser according to claim 4, wherein said bipolar electrodes are least two in number and are separated from neighbouring electrodes by separators.

6. An electrolyser according to claim 5, wherein the bipolar electrodes are corrugated, while the separators are substantially plane.

7. An electrolyser according to claim 5, wherein the bipolar electrodes are substantially plane, while the separators are corrugated.

8. An electrolyser according to claim 5, wherein said separator is made of a potassium titanate felt of fibrous texture and bound by a binding agent.

9. An electrolyser according to claim 8, wherein the binding agent is polytetrafluoroethylene.

10. An electrolyser according to claim 4, wherein the electrolyte includes an alkaline aqueous solution in a concentration which lies between normal and fourteen times normal.

11. An electrolyser according to one claim 4, wherein the operation temperature lies between the values corresponding to ambient temperature and 140° C. and that operation pressure is about 50 bars.

* * * * *